(12) United States Patent
Tanba et al.

(10) Patent No.: US 8,771,143 B2
(45) Date of Patent: Jul. 8, 2014

(54) HYBRID POWER DRIVE SYSTEM

(75) Inventors: Toshio Tanba, Aichi-ken (JP); Yuichi Fukuhara, Aichi-ken (JP); Kan Sasaki, Aichi-ken (JP); Sachio Toyora, Aichi-ken (JP); Masahiro Omura, Aichi-ken (JP)

(73) Assignees: Aisin AI Co., Ltd., Nishio-Shi, Aichi-Ken (JP); Toyota Jidosha Kabushiki Kaisha, Toyota-Shi, Aichi-Ken (JP); Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 920 days.

(21) Appl. No.: 12/936,077

(22) PCT Filed: Mar. 30, 2009

(86) PCT No.: PCT/JP2009/056490
§ 371 (c)(1),
(2), (4) Date: Apr. 13, 2011

(87) PCT Pub. No.: WO2009/123108
PCT Pub. Date: Oct. 8, 2009

(65) Prior Publication Data
US 2011/0179905 A1 Jul. 28, 2011

(30) Foreign Application Priority Data
Mar. 31, 2008 (JP) .................................. 2008-090089

(51) Int. Cl.
*B60W 10/02* (2006.01)

(52) U.S. Cl.
USPC .......................................................... 477/84

(58) Field of Classification Search
None
See application file for complete search history.

(56) References Cited

U.S. PATENT DOCUMENTS 7,056,264 B2 * 6/2006 Kupper et al. ................. 477/180
7,367,924 B2 * 5/2008 Berger et al. ................. 477/181
(Continued)

FOREIGN PATENT DOCUMENTS

| EP | 1 714 817 A1 | 10/2006 |
|---|---|---|
| JP | 2004-190705 A | 7/2004 |
| JP | 2005-186931 A | 7/2005 |
| JP | 2007-177878 A | 7/2007 |

OTHER PUBLICATIONS

Supplementary European Search Report and European Search Opinion issued on Jun. 17, 2011 by the European Patent Office in corresponding European Application No. 09733979.0.

(Continued)

*Primary Examiner* — Erin D Bishop
*Assistant Examiner* — Huan Le
(74) *Attorney, Agent, or Firm* — Buchanan Ingersoll & Rooney P.C.

(57) ABSTRACT

In a hybrid power system, when a change-speed stage selected in one of gear-shift mechanisms for first and second drive trains is switched over to another change-speed stage in the other gear-shift mechanism, deceleration in rotation speed of an engine detected by a rotation speed sensor is compared with a preset upper limit. When the deceleration in rotation speed of the engine exceeds the upper limit, the motor-generator in drive connection with an input shaft of the second drive train is activated as an electric motor to cause load torque canceling or offsetting input torque applied to the input shaft of the other gear-shift mechanism from the engine, and engagement of the change-speed stage in the other gear-shift mechanism is released after the occurrence of the load torque.

4 Claims, 5 Drawing Sheets

(56) References Cited

U.S. PATENT DOCUMENTS

| | | |
|---|---|---|
| 8,050,830 B2 * | 11/2011 | Komeda et al. .................. 701/51 |
| 8,177,685 B2 * | 5/2012 | Leibbrandt et al. ........... 477/109 |
| 2002/0033059 A1 | 3/2002 | Pels et al. |
| 2002/0177504 A1 | 11/2002 | Pels et al. |
| 2004/0116243 A1 | 6/2004 | Ibamoto et al. |
| 2005/0139035 A1 | 6/2005 | Lee et al. |
| 2006/0230855 A1 | 10/2006 | Leibbrandt et al. |
| 2006/0258506 A1 | 11/2006 | Ibamoto et al. |
| 2007/0028718 A1 | 2/2007 | Lee et al. |

OTHER PUBLICATIONS

International Search Report (PCT/ISA/210) issued on Jun. 30, 2009, by Japanese Patent Office as the International Searching Authority for International Application No. PCT/JP2009/056490.

Written Opinion (PCT/ISA/237) issued on Jun. 30, 2009, by Japanese Patent Office as the International Searching Authority for International Application No. PCT/JP2009/056490.

* cited by examiner

HYBRID POWER DRIVE SYSTEM

FIELD OF THE INVENTION

The present invention relates to a hybrid drive power system, particularly to hybrid drive power system suitable or applied to a power transmission of the dual-clutch type for an automotive vehicle.

DISCUSSION OF THE PRIOR ART

Disclosed in Japanese Patent Laid-open Publication No. 2005-186931 is a hybrid drive power system applied to a power transmission of this type. The hybrid drive power system includes first and second input shafts arranged to be alternatively rotated by drive power of the engine transmitted thereto through a dual-clutch, first and second change-speed mechanisms respectively assembled with first and second output shafts in parallel with the first and second input shafts, and a motor-generator in drive connection with the second output shaft to be activated as an electric motor for driving the first or second output shaft when supplied with electric power from a battery and to be activated as a generator for charging the battery when driven by the drive road wheels.

PROBLEMS TO BE SOLVED

In the power transmission adapted to the hybrid drive power system, the drive power of the engine is alternatively transmitted to the first and second input shafts through a first friction clutch or a second friction clutch of the dual clutch and is transmitted to the drive road wheels through the first or second gear-shift mechanism. On the other hand, when activated to operate as an electric motor or a generator, the motor-generator is drivingly connected to the second output shaft through the second input shaft and the second gear-shift mechanism. In the hybrid drive power system, when a shift stage of the first gear-shift mechanism is changed over to another shift stage of the second gear-shift mechanism, the first friction clutch is disengaged while the second friction clutch is engaged to effect changeover of the power drive train. If in such changeover of the power drive train, both the friction clutches are simultaneously engaged due to an error in operation of the control system, both the gear-shift mechanisms are interlocked and conditioned inoperative to cause sudden stopping of the engine and to disable travel of the vehicle.

SUMMARY OF THE INVENTION

A primary object of the present invention is to provide a hybrid drive power system capable of obviating the occurrence of interlock in the power transmission when the shift stage for change-speed is switched over in the hybrid drive power system.

According to the present invention, the object is accomplished by providing a hybrid drive power system which comprises a first input shaft to be applied with drive power of an engine through a first friction clutch, a first gear-shift mechanism assembled with the first input shaft to establish a first drive train; a second input shaft to be applied with the drive power of the engine through a second friction clutch, a second gear-shift mechanism assembled with the second input shaft to establish a second drive train, a motor-generator in drive connection with the first input shaft or the second input shaft, and a driven mechanism to be driven by the drive power transmitted from an output shaft of the first gear-shift mechanism or from an output shaft of the second gear-shift mechanism, wherein the hybrid drive power system comprises a rotation speed sensor provided to detect rotation speed of the engine, and control means provided to compare deceleration in rotation speed of the engine detected by the rotation speed sensor with a preset upper limit when a shift stage for change-speed selected at one of the gear-shift mechanisms is switched over to another shift stage for change-speed of the other gear-shift mechanism to activate the motor-generator as an electric motor when the deceleration in rotation speed of the engine exceeds the upper limit thereby to cause a load torque canceling or offsetting input torque applied to the input shaft of the other gear-shift mechanism from the engine and to release engagement at the shift stage of the other gear-shift mechanism after the occurrence of the load torque.

In the hybrid drive power system described above, it is desirable that the input shaft of the other gear-shift mechanism is provided with a torque sensor for detecting input torque from the engine and that the control means includes means for controlling operation of the motor-generator in such a manner that load toque applied to the input shaft of the other gear-shift mechanism becomes substantially the same as toque detected by the torque sensor. In such a case, it is desirable that when a shift stage for change-speed selected at one of the gear-shift mechanisms is switched over to another shift stage of the other gear-shift mechanism, the motor-generator is repeatedly activated as the electric motor to cause the load torque until the deceleration in rotation speed of the engine becomes less than the upper limit.

In the hybrid drive power system described above, if the second friction clutch is engaged prior to or at the same as disengagement of the first friction clutch of the first drive train when a shift stage for change-speed selected at one of the gear-shift mechanisms is switched over to another shift stage of the other gear-shift mechanism, there is a possibility that each shaft of both the gear-shift mechanisms is interlocked. In such an instance, torque transmitted to the other input shaft from the engine is cancelled or offset by load torque caused by activation of the motor-generator so that the engagement at the shift stage of the other gear-shift mechanism is easily released to maintain the engagement at the previously selected shift stage for enabling travel of the vehicle.

DESCRIPTION OF THE PREFERRED EMBODIMENT

Hereinafter, a first embodiment of a hybrid drive power system for an automotive vehicle according to the present invention will be described with reference to FIGS. 1~4. In this embodiment, the hybrid drive power system is adapted to an automatic power transmission TM of forward six speed stages and a backward stage.

The automatic power transmission is in the form of a gear transmission of the dual-clutch type wherein a first input shaft 13a and a second input shaft 13b are rotatably mounted in parallel within a transmission housing H and drivingly connected to an output shaft 10a of an engine 10 through a first friction clutch C1 and a second friction clutch C2. An input member of first friction clutch C1 is connected to a support shaft 11d of a driven gear 11b in mesh with a drive gear 11a for rotation with the output shaft 10a of engine 10. Similarly, an input member of friction clutch C2 is connected to a support shaft 11e of a driven gear 11c in mesh with the drive gear 11a for rotation with the output shaft 10a of engine 10. A first output shaft 14a and a second output shaft 14b are arranged respectively in parallel with the input shafts 13a and 13b and drivingly connected to a third output shaft 14c through drive gears 14d and 14e in mesh with a driven gear 14f supported on the third output shaft 14c. The third output shaft 14c is drivingly connected to a set of drive road wheels 19, 19 through a drive pinion 16a, a ring gear 16b, a differential gear 17 and a set of axle shafts 18, 18.

The first and second friction clutches C1 and C2 in the form of a dual-clutch 12 are brought into half engagement in transit of changeover of shift stages for change-speed to increase or decrease transfer torque relatively in reverse in a normal condition. After changeover of the shift stage for change-speed, the dual-clutch 12 is operated under control of a controller 20 as described later so that one of the friction clutches is completely engaged to maximize the transfer torque, while the other friction clutch is completely disengaged to make the transfer torque zero (0).

A first gear-shift mechanism SM1 is provided between first input shaft 13a and first output shaft 14a; and a second gear-shift mechanism SM2 is provided between second input shaft 13b and second output shaft 14b. The first gear-shift mechanism SM1 includes gear sets G1, G3, G5 for first, third and fifth speed stages (odd change speed stages) and a reverse gear train GB for backward. Each drive gear of gear sets G1, G3, G5 and reverse gear train GB is fixedly supported on the first input shaft 13a for rotation therewith, and each driven gear of the gear sets and reverse gear train is rotatably supported on the first output shaft 14a. A first changeover clutch D1 is provided between the driven gear of first speed gear set G1 and the driven gear of third speed gear set G3 for selective connection with the first output shaft 14a. A third changeover clutch D3 is provided between the driven gear of fifth speed gear set G5 and the driven gear of reverse gear train GB for selective connection with the first output shaft 14a. An idle gear is interposed between the drive and driven gears of reverse drive train GB.

The second gear-shift mechanism SM2 includes gear sets G2, G4, G6 for second, fourth and sixth speed stages (even change speed stages). Each drive gear of the gear sets G2, G4; G6 is fixedly supported on the second input shaft 13b for rotation therewith, and each driven gear of the gear sets is rotatably supported on the second output shaft 14b. A second changeover clutch D2 is provided between the driven gear of second speed gear set G2 and the driven gear of fourth speed gear set G4 for selective connection with the second output shaft 14b. A fourth changeover clutch D4 is provided at one side of the driven gear of sixth speed gear set G6 for selective connection with the second output shaft 14b.

The changeover clutches D1~D4 each are in the form of a well known synchromesh mechanism which includes a clutch hub L respectively fixed to the first output shaft 14a and the second output shaft 14b and a shift sleeve (a shift member) M in splined engagement with the clutch hub. When shift forks F1~F4 are selectively shifted in an axial direction, the shift sleeve M is engaged with a side gear of the driven gear for selective connection with the clutch hub L.

In the first embodiment, the controller 20 for the hybrid drive power system comprises a rotation speed sensor 21 provided for detecting rotation speed of the driven gear 11c driven by the drive power of engine 10, and a torque sensor 22 provided for detecting torque T transferred to the second input shaft 13b through the second friction clutch C2. The rotation speed sensor 21 is in the form of a magnetic sensor for detecting rotation speed of the driven gear 11c. The controller 20 receives detection signals of the rotation speed sensor 21 to calculate rotation speed of engine based on timing of the detection signals from sensor 21. The torque sensor 22 is provided on the second input shaft 13b at a position between second friction clutch C2 and second gear-shift mechanism SM2. The motor-generator 15 is drivingly connected to one end of the second input shaft 13b positioned at the opposite side of second friction clutch C2.

In a condition where the output of the engine becomes sufficient for start of the vehicle, the motor-generator 15 is supplied with electric power from a battery (not shown) to operate as, an electric motor and to cooperate with the engine for driving the road wheels 19, 19. In a condition where the engine is driven from the drive road wheels 19, 19 or the output of engine 10 becomes sufficient for travel of the vehicle, the motor-generator 15 is activated as a generator to charge the battery. Although the motor-generator 15 in this embodiment is connected to one end of the second input shaft 13b, it may be connected to the first input shaft 13a.

Hereinafter, the function of the controller 20 in the hybrid drive power system will be described. When the vehicle is inoperative in a stopped condition, the first and second friction clutches C1 and C2 are in a released condition, and each changeover clutch D1~D4 of the first and second gear-shift mechanisms SM1 and SM2 is in a neutral position as shown in FIG. 1. When a shift lever (not shown) is shifted to a forward position in a condition where the engine 10 has started to operate the drive road wheels 19, 19, the controller 20 causes the first shift fork F1 to shift the sleeve M of first changeover clutch D1 rightward so that a drive train at the first speed is established by the first speed gear set G1 in the first gear-shift mechanism SM1. When the rotation speed of engine 10 exceeds a predetermined low speed, the controller 20 causes the first friction clutch C1 of dual-clutch 12 to gradually engage so that the drive torque of engine 10 is transmitted to the drive road wheels 19, 19 through the first input shaft 13a, first speed gear set G1, first changeover clutch D1, first output shaft 14a, gears 14d, 14f, third output shaft 14c, gears 16a, 16b, differential gear 17 and axle shafts 18, 18 to start the vehicle at the first speed. When the vehicle speed becomes suitable for travel at the second speed, the controller 20 causes the shift fork F2 to shift the sleeve M of second changeover clutch D2 rightward so that a drive train at the second speed stage is established by the second speed gear set G2 of the second gear-shift mechanism SM2 and causes the second friction clutch C2 to engage after release of first friction clutch C1. After engagement of the second friction clutch C2, the controller 20 causes the shift fork F1 to return the sleeve M of first changeover clutch D1 to the neutral position. Thereafter, the controller 20 causes the first friction clutch C1 and the second friction clutch C2 to alternately engage for sequentially establishing a drive train at the other speed stage suitable for travel condition of the vehicle in a similar manner described above. Shift-down of the change-speed stage is effected by reverse control of the foregoing control. In FIG. 2, the arrow of a solid line represents a transfer path of the drive power of engine 20 in a condition where the vehicle is traveling at the third speed selected in the first gear-shift mechanism SM1. In FIG. 2, the arrow of a broken line represents a transfer path of the drive power of engine 10 in a condition where the vehicle is traveling at the fourth speed effected by the fourth speed gear set G4 in the second gear-shift mechanism SM2.

When the shift lever is shifted to a reverse position in a stopped condition of the vehicle, the controller 20 causes the shift fork F3 to shift the sleeve M of third changeover clutch D3 leftward for establishing a drive train at the reverse stage. When the rotational speed of engine 10 is increased, the controller 20 causes the first friction clutch C1 to gradually engage for transmitting the drive torque of engine 10 to the first output shaft 14a through the reverse gear train GB.

When the shift lever is shifted to the forward position in a stopped condition of the vehicle to activate the motor-generator 15 as an electric motor for starting the vehicle, the controller 20 causes the first gear-shift mechanism SM1 to establish a drive train at the first speed step in the same manner for transfer of the drive torque of engine 10. In such an instance; the motor-generator 15 is supplied with electric power and activated as an electric motor under control of the controller 20, and the first and second friction clutches C1 and C2 are gradually engaged at the same time under control of the controller 20. Thus, the drive torque of motor-generator 15 is transferred to the drive road wheels 19, 19 through second input shaft 13b, first and second friction clutches C1, C2, first input shaft 13a, first speed gear set G1, first changeover clutch D1, first output shaft 14a, gears 14d, 14f, third output shaft 14c, gears 16a, 16b, differential gear 17 and axle shafts 18, 18 thereby to start the vehicle at the first speed. When the movement of the vehicle becomes suitable for travel at the second speed, the supply of electric power to the motor-generator 15 is temporarily stopped under control of controller 20, and the first changeover clutch D1 is returned to the neutral position after release of both the friction clutches C1 and C2 under control of the controller 20. In such an instance, the second gear-shift mechanism SM2 is operated in the same manner as described above to establish a drive train at the second speed, and the motor-generator 15 is supplied with the electric power and activated as an electric motor under control of the controller 20. This causes the vehicle to travel at the second speed.

When the first gear-shift mechanism SM1 is operated to establish a drive train at a speed suitable for travel condition of the vehicle, both the friction clutches C1 and C2 are engaged under control of the controller 20. When the second gear-shift mechanism SM2 is operated to establish a drive train suitable for travel condition of the vehicle, the engagement of both the friction clutches C1 and C2 is released under control of the controller 20. Shift-down of the shift stage is effected by reverse control of the foregoing control. In FIG. 3, the arrow of a solid line represents a transfer path of the drive power of motor-generator 15 in a condition where the vehicle is traveling at the first speed stage of first gear-shift mechanism SM1, and the arrow of a broken line represents a transfer path of the drive power of motor-generator 15 in a condition where the vehicle is traveling at the second speed stage of second gear-shift mechanism SM2.

When the motor-generator 15 cooperates with the engine to drive the drive road wheels 19, 19, both the friction clutches C1 and C2 are engaged to transfer the drive power of motor-generator 15 at a selected speed stage of the first gear-shift mechanism SM1. In such an instance, the drive power of engine 10 is transferred at the same speed stage as the selected speed stage of first gear-shift mechanism SM1 to obviate interlock in the gear transmission TM as described later. In a condition where the reverse gear train GB is established, backward movement of the vehicle is effected by the drive power of motor-generator 15.

Hereinafter, means for obviating interlock in the gear transmission will be described. As described above, the arrow of solid line in FIG. 2 represents a transfer path of the drive power of engine 10 in a condition where the first input shaft 13a is drivingly connected to the first output shaft 14a by means of the third speed gear set G3 and where the first friction clutch C1 is engaged to cause the vehicle to travel at the third speed. To switch over the drive train from the third speed to the fourth speed, the sleeve M of second changeover clutch D2 is shifted leftward so that the second input shaft 13b is drivingly connected to the second output shaft 14b by means of the fourth speed gear set G4 in a condition where the engagement of second friction clutch C2 is released. Subsequently, the second friction clutch C2 is engaged after release of first friction clutch C1. Thereafter, the sleeve M of first changeover clutch D1 is shifted rightward to release the drive connection of the first input shaft 13a with the first output shaft 14a. Thus, the transfer path of the drive power at the third speed shown by the arrow of the solid line in FIG. 2 is removed, while a transfer path of the drive power at the fourth speed is established as shown by the arrow of the broken line in FIG. 2.

If the engagement of first friction clutch C1 is not released due to an error in the control system when the drive train is switched over from the third speed to the fourth speed, both the friction clutches C1 and C2 are remained in an engaged condition. In such an instance, the engine 10 is drivingly connected to the third output shaft 14c through the third speed gear set G3 and the fourth speed gear set G4 at a different speed ratio. This causes interlock of the respective shafts 13a, 13b, 14a, 14b in the gear transmission TM, resulting in sudden stop of the engine during travel of the vehicle at the third speed. Even in the occurrence of interlock in the gear transmission caused by the engagement of first friction clutch C1, the controller 20 tends to cause the shift fork F1 to shift the sleeve M of first changeover clutch D1 rightward for releasing the drive connection between first input shaft 13a and first output shaft 14a. However, the sleeve M of first changeover clutch D1 may not be shifted due to frictional resistance caused by transfer torque applied thereto. It is, therefore, disable to release the interlock in the gear transmission. Such interlock in the gear-transmission is also caused by an error of the control system.

To obviate the foregoing interlock in the gear transmission, the controller 20 in the first embodiment repeatedly executes processing of a control program shown in FIG. 4 at interval of a short period of time. In processing of the control program, the controller detects the rotation speed of engine 10 based on detection signals of rotation speed sensor 21 to calculate fluctuation of the rotation speed and deceleration S in rotation speed of engine at step 100. Simultaneously, the controller 20 detects a torque transferred to second input shaft 13b through the second friction clutch C2 to compare the transferred torque with a preset upper limit SO at step 101. The upper limit is determined to ensure a normal operation without causing any interlock in the gear transmission described above. If the transfer torque S is less than the upper limit (S>SO) in a normal condition, the controller 20 determines a "No" answer at step 101 and ends the processing of the program.

If the gear transmission tends to cause interlock in shift operation, the rotation speed of engine abruptly decreases, resulting sudden increase of the deceleration S in rotation speed of engine 10. Thus, the controller 20 determines a "Yes" answer to cause the program to proceed to step 102. At step 102, the controller causes the motor-generator 15 to activate as an electric motor for generating load torque counteracting against the torque transferred to second input shaft 13b from engine 10. In such an instance, it is preferable that the load torque is substantially the same as torque detected by the torque sensor 22. Subsequently, the controller 20 causes the shift fork at step 103 to shift the sleeve M of second gear-shift mechanism SM2 in a direction for releasing engagement of the change speed stage selected at the gear-shift mechanism. After processing at step 103, the controller 20 causes the control program to return to step 100.

The load torque caused by activation of motor-generator 15 at step 102 is applied to the second input shaft 13b against the toque transferred thereto through the second friction clutch C2. The load torque is substantially the same as the torque detected by torque sensor 22. As a result, the torque transferred to second output shaft 14b through second gear-shift mechanism SM2 becomes substantially zero (0) to facilitate release engagement of the change speed stage in second gear-shift mechanism SM2 under control of the controller 20 thereby to obviate the occurrence of interlock in the gear transmission TM. At this time, as the deceleration S in rotation speed of the engine detected at step 100 becomes less than the upper limit SO, the controller 20 ends processing of the control program at step 101.

In case there is a difference between the detection time of torque transferred to second input shaft 13b and the occurrence time of the load torque, the change-speed stage of second gear-shift mechanism SM2 may not be released by processing at step 103 due to increase of the torque transferred to second output shaft 14b. In such an instance, the controller 20 repeatedly executes the processing at step 101~103 to release interlock in the gear transmission and ends the processing of the control program.

In the first embodiment, when interlock in the gear transmission tends to occur due to an error of the control system, the change-speed stage in second gear-shift mechanism SM2 is automatically released to obviate the occurrence of interlock thereby to prevent sudden stop of engine 10 during travel of the vehicle. Although the foregoing control was described with respect to an instance where a change-speed stage of first gear-shift mechanism SM1 is switched over to another change-speed stage of second gear-shift mechanism SM2, the control is effected when a change-speed stage of second gear-shift mechanism SM2 is switched over to another change-speed stage of first gear-shift mechanism SM1.

Illustrated in FIG. 5 is a control program executed byte controller 20 in a second embodiment of the present invention. Processing at step 200, 201, 202 and 203 corresponds with the processing at step 100, 101, 102 and 103 of the control program shown in FIG. 4. In processing of the control program shown in FIG. 5, the controller 20 detects a deceleration in rotation speed of engine 10 at step 200 and activates the motor-generator at step 202 to cause load torque of a predetermined value for obviating the occurrence of interlock in shift operation of the change-speed stage. In the case that the value of load torque is determined for canceling or offsetting torque transferred to the second input shaft 13b, it becomes unnecessary to provide the torque sensor 22 for detecting torque transferred to the second input shaft 13b in the gear transmission TM.

In processing of the control program, the controller 20 detects the deceleration S in rotation speed of engine 10 at step 200 based on detection signals from rotation speed sensor 21 to compare the detected deceleration with the upper limit SO as in the first embodiment. If the detected deceleration S is less than the upper limit SO in a normal condition, the controller 20 determines a "No" answer at step 201 and ends the processing of the control program. If there is a possibility that the gear transmission is interlocked in shift operation of the change speed stage, the deceleration S of engine 10 becomes more than the upper limit SO. In such an instance, the controller 20 activates the motor-generator 15 at step 202 to generate load torque counteracting against transferred to the second input shaft 13b. Subsequently, the controller 20 causes the shift fork at step 203 to shift the sleeve M of the change-speed stage for releasing the engagement at the change-speed stage in the gear-shift mechanism SM2. If the engagement at the change-speed stage may not be released, the controller 20 repeats the processing at step 200, 201, 202 and 203. Thus, the load torque applied to second input shaft 13b is increased by activation of the motor-generator 15 to decrease the torque transferred to output shaft 14b through the second gear-shift mechanism SM2. When the load torque becomes the predetermined value, the engagement at the change-speed stage is released to obviate the occurrence of interlock in the gear transmission.

Although in the first and second embodiments, the hybrid drive power system of the present invention was adapted to the gear transmission TM shown in FIG. 1, the present invention may be adapted to an automatic transmission of the dual clutch type shown in FIG. 6. In the automatic transmission, first and second input shafts 13a and 13b are coaxially arranged to be driven by engine 10 through a dual-clutch 12 composed of first and second friction clutches C1 and C2. The second input shaft 13b is in the form of a tubular shaft in, surrounding relationship with first input shaft 13a. The output shafts 14a, 14b, 14c in the gear transmission TM shown in FIG. 1 are in the form of a single output shaft 14 in parallel with the coaxial first and second input shafts 13a, 13b. A clutch cover 12a of dual-clutch 12 is connected to the output shaft 10a of engine 10 so that the first and second input shafts 13a and 13b are driven by engine through dual-clutch 12. A rotation speed sensor 21 is arranged to detect rotation speed of clutch cover 12a. The output shaft 14 is drivingly connected to the drive road wheels 19, 19 through final reduction gears 16c, 16d, differential gear set 17 and axle shafts 18, 18. The first gear-shift mechanism SM1 is arranged between a rear half portion of first input shaft 13a and output shaft 14, and the second gear-shift mechanism SM2 is arranged between second input shaft 13b and output shaft 14. These gear-shift mechanisms SM1 and SM2 are substantially the same in construction as those in the first embodiment shown in FIG. 1. The motor-generator 15 is drivingly connected to the second input shaft 13b through a sixth speed gear set 06 in mesh with a gear 15b fixed to its output shaft 15a.

The function of the automatic transmission is substantially the same as that of the gear transmission shown in FIG. 1. The controller 20 executes processing of the control program shown in FIG. 5 to obviate the occurrence of interlock caused by engagement of both the friction clutches C1 and 2 when a change-speed stage of first gear-shift mechanism SM1 is switched over to another change-speed stage of second gear-shift mechanism SM2.

DESCRIPTION OF REFERENCE NUMERALS

Figure 1:
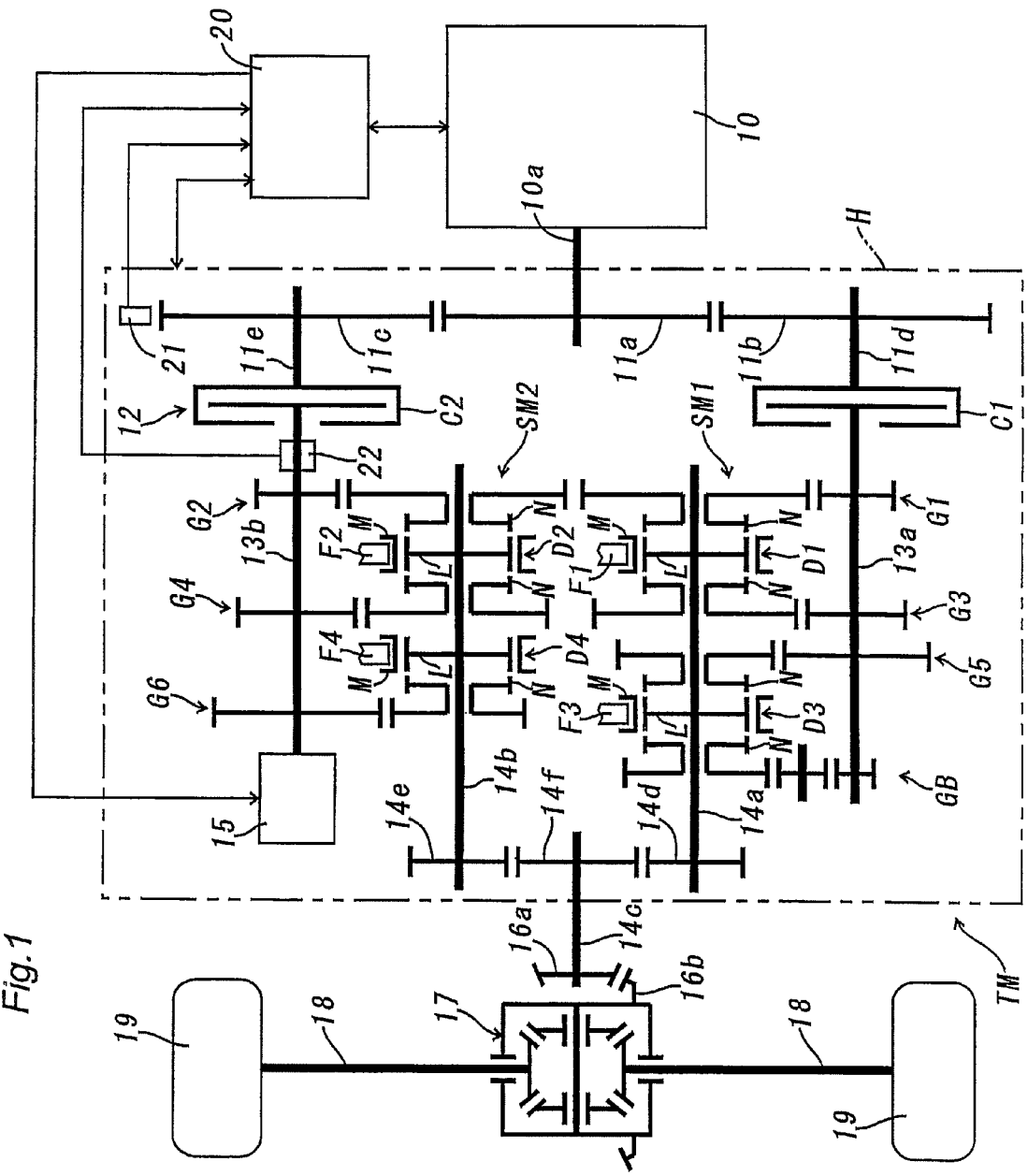
FIG. 1 is a skeleton view illustrating the whole construction of a hybrid drive power system in a first embodiment of the present invention.
Figure 2:
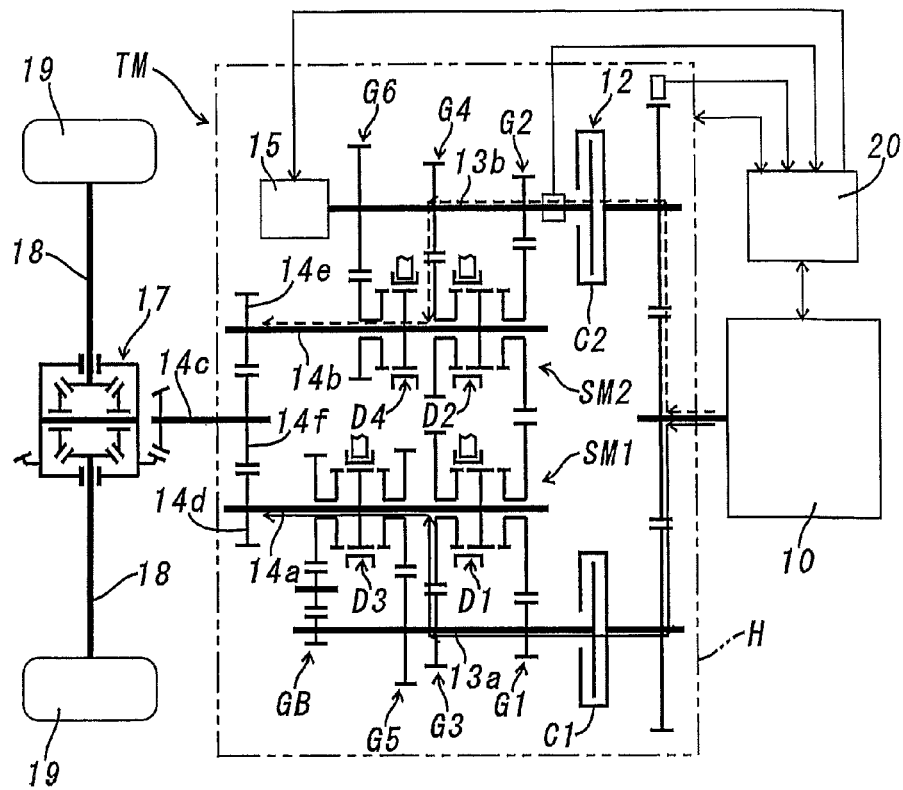
FIG. 2 is a skeleton view illustrating a transfer path of the drive power of an engine.
Figure 3:
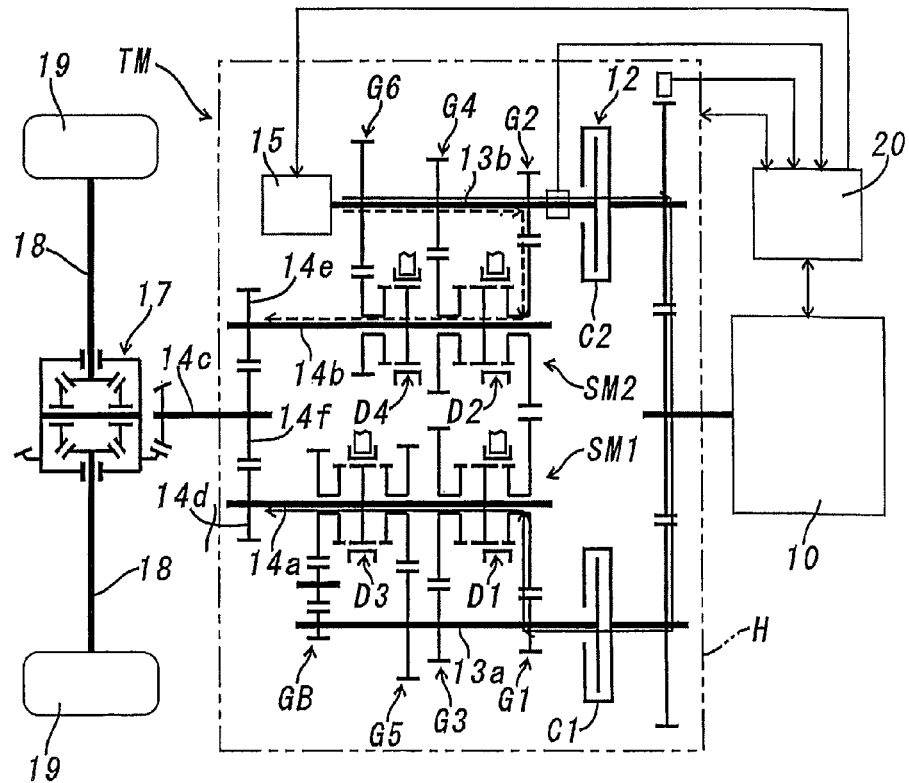
FIG. 3 is a skeleton view illustrating a transfer path of the drive power of a motor-generator.
Figure 4:
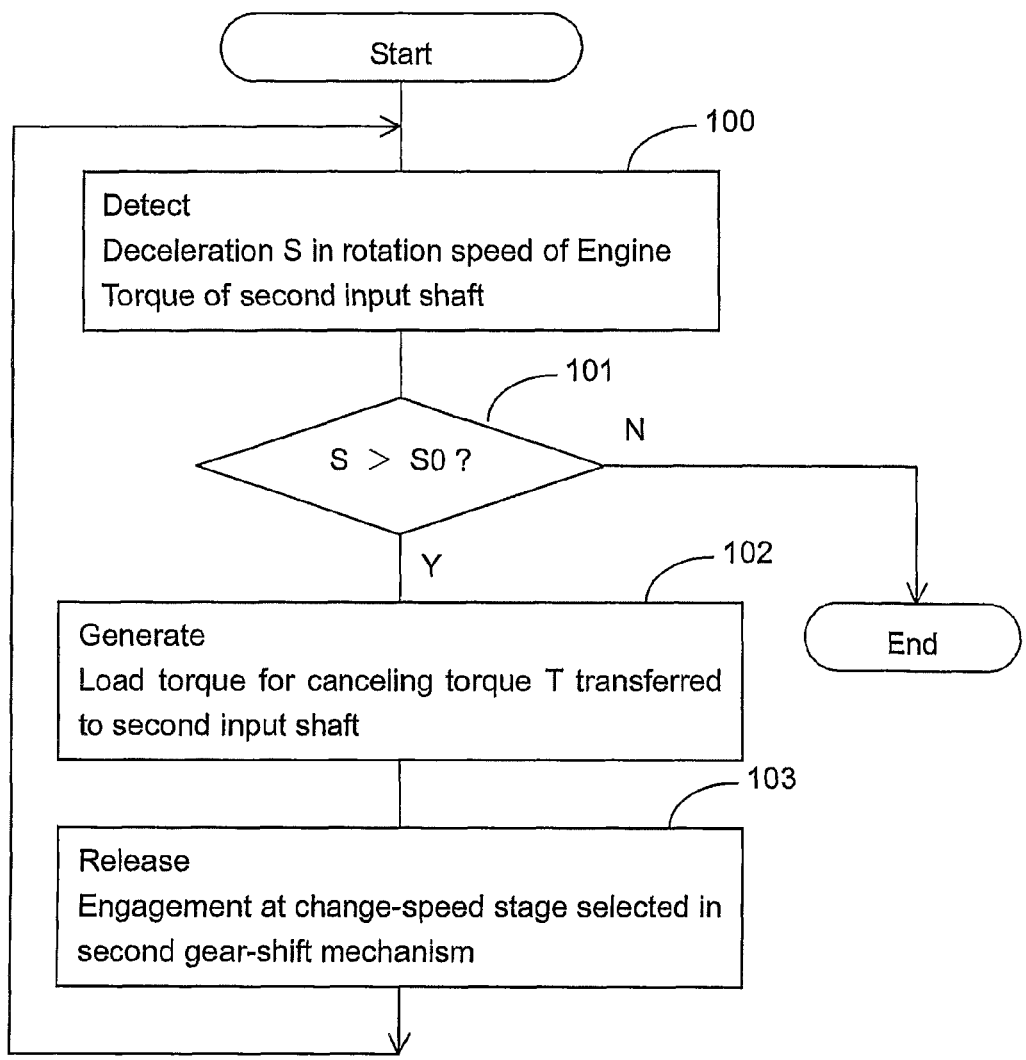
FIG. 4 is a flow chart of a control program executed by a controller in the first embodiment shown in FIG. 1.
Figure 5:
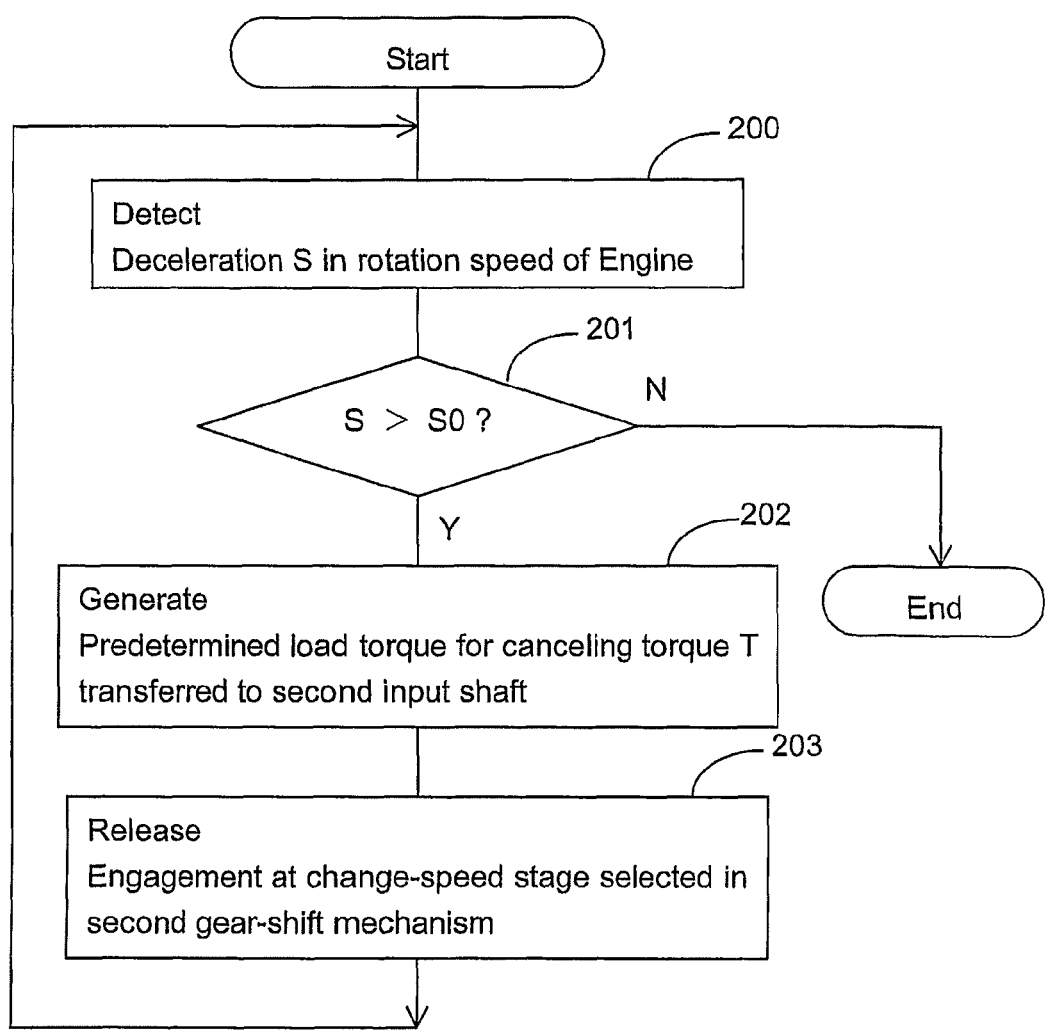
FIG. 5 is a flow chart of a control program executed by a controller in the second embodiment.
Figure 6:
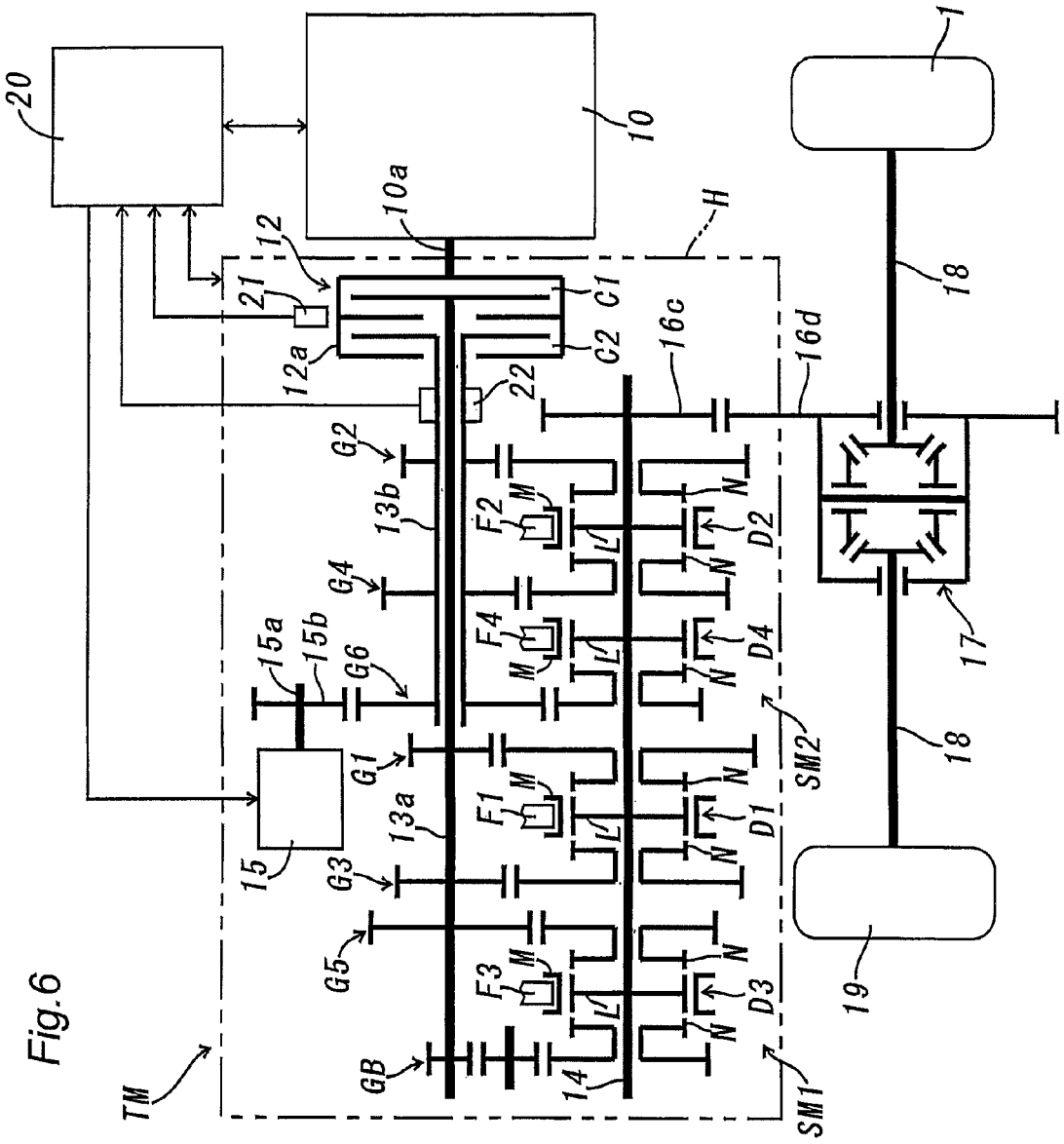
FIG. 6 is a skeleton view of a modification of the hybrid drive power system shown in FIG. 1.

10 . . . Engine, 12 . . . Dual-clutch, 13a . . . First input shaft, 13b . . . Second input shaft, 14, 14a, 14b . . . Output shaft (First output shaft, Second output shaft), 15 . . . Motor-generator, 19 . . . Drive wheels, 20 . . . Controller, 21 . . . Rotation speed sensor, 22 . . . Torque sensor, C1 . . . First friction clutch, C2, . . . Second friction clutch, SM1 . . . First gear-shift mechanism, SM2 . . . Second gear-shift mechanism.

The invention claimed is:

1. A hybrid drive power system comprising:
a first gear-shift mechanism assembled with a first input shaft to be applied with the drive power of an engine through a first friction clutch,
a second gear-shift mechanism assembled with a second input shaft to be applied with the drive power of the engine through a second friction clutch,
a motor-generator in drive connection with the first input shaft or the second input shaft, and a driven mechanism to be driven by the drive power transmitted from an output shaft of the first gear-shift mechanism or from an output shaft of the second gear-shift mechanism,
a rotation speed sensor provided to detect a rotation speed of the engine, and
control means for comparing a deceleration in the rotation speed of the engine detected by the rotation speed sensor with a preset upper limit when a change-speed stage selected at either one of the first and second gear-shift mechanisms is switched over to another change-speed stage of the other one of the first and second gear-shift mechanisms, for activating the motor-generator as an electric motor to cause load torque counteracting against input torque applied to the input shaft of the other one of the first and second gear-shift mechanisms from the engine when the deceleration in the rotation speed of the engine exceeds the upper limit and for releasing engagement of the change-speed stage selected at the other one of the first and second gear-shift mechanisms after the input torque is counteracted by the load torque.

2. A hybrid drive power system as claimed in claim 1, wherein the input shaft of the other one of the first and second gear-shift mechanisms is provided with a torque sensor for detecting input torque applied thereto from the engine and wherein the control means includes means for controlling operation of the motor-generator in such a manner that the load torque applied to the input shaft of the other one of the first and second gear-shift mechanisms becomes substantially the same as the input torque detected by the torque sensor.

3. a hybrid drive power system as claimed in claim 2, wherein when a change-speed stage selected at one of the gear-shift mechanisms is switched over to another change-speed stage selected at the other one of the first and second gear-shift mechanisms, the motor-generator is repeatedly activated as the electric motor to cause the load torque until the deceleration in rotation speed of the engine becomes less than the upper limit.

4. A hybrid drive power system comprising:
a first gear-shift mechanism assembled with a first input shaft to be applied with drive power from an engine through a first friction clutch,
a second gear-shift mechanism assembled with a second input shaft to be applied with the drive power of the engine through a second friction clutch,
a motor-generator in drive connection with the second input shaft,
a rotation speed sensor which detects a rotation speed of the engine,
a driven mechanism to be driven by drive power selectively transmitted from an output shaft of the first gear-shift mechanism or from an output shaft of the second gear-shift mechanism, and
a control means for:
(i) comparing a deceleration in the rotation speed of the engine detected by the rotation speed sensor with a preset upper limit when a change-speed stage selected at the first gear-shift mechanism is switched over to another change-speed stage selected at the second gear-shift mechanism,
(ii) activating the motor-generator as an electric motor to cause load torque counteracting against input torque applied to the second input shaft from the engine when the deceleration in the rotation speed of the engine exceeds the upper limit, and
(iii) releasing engagement of the change-speed stage selected at the second gear-shift mechanism after the input torque applied to the second input shaft is counteracted by the load torque.

* * * * *